(12) United States Patent
Wou et al.

(10) Patent No.: US 11,034,384 B2
(45) Date of Patent: Jun. 15, 2021

(54) VEHICLE STEERING SYSTEM

(71) Applicant: Ford Global Technologies, LLC, Dearborn, MI (US)

(72) Inventors: Soungjin Wou, Novi, MI (US); Anand Pradip Naik, Royal Oak, MI (US); Bradley G. Hochrein, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 16/118,559

(22) Filed: Aug. 31, 2018

(65) Prior Publication Data

US 2020/0070886 A1 Mar. 5, 2020

(51) Int. Cl.
| | |
|---|---|
| *B62D 15/02* | (2006.01) |
| *B62D 5/065* | (2006.01) |
| *G01L 5/22* | (2006.01) |
| *B62D 5/18* | (2006.01) |
| *B62D 5/14* | (2006.01) |

(52) U.S. Cl.
CPC ........... *B62D 15/025* (2013.01); *B62D 5/065* (2013.01); *B62D 5/14* (2013.01); *B62D 5/18* (2013.01); *G01L 5/221* (2013.01)

(58) Field of Classification Search
CPC ........ B62D 15/025; B62D 5/065; B62D 5/18; B62D 5/14; B62D 5/04; B62D 5/06; B62D 5/064; B62D 5/30; G01L 5/221

USPC ......................................................... 180/421
See application file for complete search history.

(56) References Cited

U.S. PATENT DOCUMENTS

| | | | |
|---|---|---|---|
| 4,685,528 A | 8/1987 | Suzuki et al. | |
| 4,940,107 A | 7/1990 | Hanisko | |
| 6,282,472 B1 | 8/2001 | Jones et al. | |
| 6,425,454 B1 | 7/2002 | Chabaan et al. | |
| 6,845,309 B2 | 1/2005 | Recker et al. | |
| 7,044,046 B2 | 5/2006 | Wietzel et al. | |
| 8,074,763 B2 | 12/2011 | Hung et al. | |
| 2012/0226417 A1* | 9/2012 | Nishikawa | B60W 30/12 701/42 |
| 2019/0322315 A1* | 10/2019 | Birsching | B62D 5/062 |

* cited by examiner

*Primary Examiner* — Minnah L Seoh
*Assistant Examiner* — Felicia L. Brittman
(74) *Attorney, Agent, or Firm* — Ray Coppiellie; Bejin Bieneman PLC

(57) ABSTRACT

A system includes a torque overlay device having an input shaft and an output shaft coupled to the input shaft. The system includes a steering wheel coupled to the input shaft. The system includes a processor and a memory storing instructions executable by the processor to detect a torque applied to the input shaft and to actuate the torque overlay device to provide torque to the output shaft in a direction opposite the torque applied to the input shaft.

15 Claims, 5 Drawing Sheets

VEHICLE STEERING SYSTEM

BACKGROUND

A steering system for a vehicle controls a steering angle of wheels of the vehicle. The steering system may include a hydraulic steering assembly that provides a power assist to move the wheels in response to an occupant input to a steering wheel of the vehicle.

DETAILED DESCRIPTION

Figure 1:
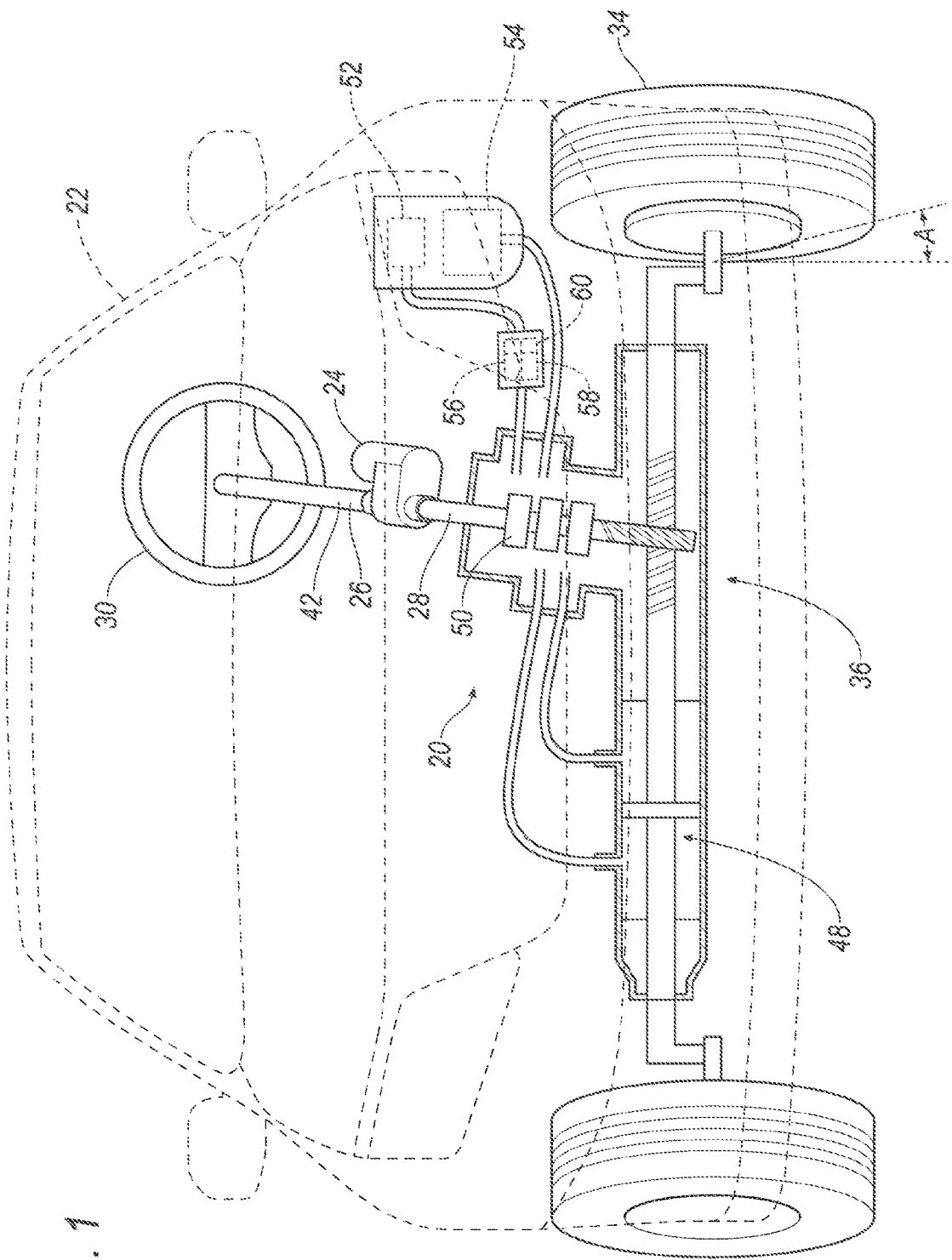
FIG. 1 is a front view of a vehicle having a steering system.

A system includes a torque overlay device having an input shaft and an output shaft coupled to the input shaft. The system includes a steering wheel coupled to the input shaft. The system includes a processor and a memory storing instructions executable by the processor to detect a torque applied to the input shaft and to actuate the torque overlay device to provide torque to the output shaft in a direction opposite the torque applied to the input shaft.

The torque overlay device may include a torsion bar connecting the input shaft to the output shaft.

The memory may store instructions executable by the processor to detect the torque applied to the input shaft based on a detected strain of the torsion bar.

The system may include a hydraulic steering assembly coupled to the output shaft.

The hydraulic steering assembly may include a first pressure regulator, a second pressure regulator that outputs fluid at a lower pressure than the first pressure regulator, and a valve designed to selectively provide fluid to the first pressure regulator or the second pressure regulator.

The memory may store instructions executable by the processor to actuate the valve to provide fluid to the second pressure regulator in response to detecting a fault.

The valve may be designed to provide fluid to the second pressure regulator when the valve is in an unpowered state.

The hydraulic steering assembly may include a pump designed to provide fluid to the valve.

The memory may store instructions executable by the processor to actuate the torque overlay device to provide torque to the output shaft in the direction opposite the torque applied to the input shaft in response to detecting a vehicle speed above a predetermined threshold.

The memory may store instructions executable by the processor to actuate the torque overlay device to provide torque to the output shaft at a first magnitude and in the direction opposite the torque applied to the input shaft in response to detecting a vehicle speed above a predetermined threshold, and to provide torque to the output shaft at a second magnitude that is less than the first magnitude and in the direction opposite the torque applied to the input shaft in response to detecting a vehicle speed below the predetermined threshold.

A system includes a processor and a memory storing instructions executable by the processor to detect a torque applied to an input shaft of a torque overlay device coupled to a steering wheel, and actuate the torque overlay device to provide torque to an output shaft of the torque overlay device in a direction opposite the torque applied to the input shaft.

The memory may store instructions executable by the processor to detect the torque applied to the input shaft based on a detected strain of a torsion bar connecting the input shaft to the output shaft.

The memory may store instructions executable by the processor to actuate the torque overlay device to provide torque to the output shaft in the direction opposite the torque applied to the input shaft in response to detecting a vehicle speed above a predetermined threshold.

The memory may store instructions executable by the processor to actuate the torque overlay device to provide torque to the output shaft at a first magnitude and in the direction opposite the torque applied to the input shaft in response to detecting a vehicle speed above a predetermined threshold, and to actuate the torque overlay device to provide torque to the output shaft at a second magnitude that is less than the first magnitude and in the direction opposite the torque applied to the input shaft in response to detecting a vehicle speed below the predetermined threshold.

The memory may store instructions executable by the processor to actuate a valve to provide fluid to a first pressure regulator of a hydraulic steering assembly prior to detecting a fault, and to actuate the valve to provide fluid to a second pressure regulator of the hydraulic steering assembly that outputs fluid at a lower pressure than the first pressure regulator in response to detecting the fault.

A method includes detecting a torque applied to an input shaft of a torque overlay device coupled to a steering wheel. The method includes actuating the torque overlay device to provide torque to an output shaft of the torque overlay device in a direction opposite the torque applied to the input shaft.

The method may include detecting the torque applied to the input shaft based on a detected strain of a torsion bar connecting the input shaft to the output shaft.

The method may include actuating the torque overlay device to provide torque to the output shaft in the direction opposite the torque applied to the input shaft in response to detecting a vehicle speed above a predetermined threshold.

The method may include actuating the torque overlay device to provide torque to the output shaft at a first magnitude and in the direction opposite the torque applied to the input shaft in response to detecting a vehicle speed above a predetermined threshold, and actuating the torque overlay device to provide torque to the output shaft at a second magnitude that is less than the first magnitude and in the direction opposite the torque applied to the input shaft in response to detecting a vehicle speed below the predetermined threshold.

The method may include providing fluid to a first pressure regulator of a hydraulic steering assembly prior to detecting a fault, and providing fluid to a second pressure regulator of the hydraulic steering assembly that outputs fluid at a lower pressure than the first pressure regulator in response to detecting the fault.

With reference to the Figures, wherein like numerals indicate like parts throughout the several views, a steering system 20 for a vehicle 22 includes a torque overlay device 24 having an input shaft 26 and an output shaft 28 coupled to the input shaft 26. The steering system 20 includes a steering wheel 30 coupled to the input shaft 26. The steering system 20 includes a computer 32 having a processor and a memory storing instructions executable by the processor to detect a torque T1 applied to the input shaft 26, e.g., from the steering wheel 30, and to actuate the torque overlay device 24 to provide torque T2 to the output shaft 28 in a direction opposite the torque T1 applied to the input shaft 26.

The steering system 20 controls turning of wheels 34 of the vehicle 22, e.g., a steering angle A of the wheels 34. The steering system 20 is in communication with and receives input from the steering wheel 30 and the computer 32. The steering system 20 may include a hydraulic steering assembly 36 that operates at a sufficiently high pressure, e.g., 1000 psi, such that torque less than or equal to a predetermined maxim value, e.g., 3 kilonewton-meters, provided by the torque overlay device 24 may change the steering angle A of wheels 34 of the vehicle 22 without operator assistance, e.g., autonomously. Actuating the torque overlay device 24 to provide torque T2 to the output shaft 28 in a direction opposite the torque T1 applied to the input shaft 26 aids in providing a responsiveness to the steering system 20 similar to steering systems that include a hydraulic steering assembly that operates at a relatively lower pressure, e.g., 200 psi. In other words, providing torque T2 to the output shaft 28 in the direction opposite the torque T1 applied to the input shaft 26 reduces a sensitively of the steering system 20 to input from an operator of the vehicle 22 via the steering wheel 30.

The vehicle 22 may be any passenger or commercial automobile such as a car, a truck, a sport utility vehicle, a crossover vehicle, a van, a minivan, a taxi, a bus, etc.

The computer 32 may operate the vehicle 22 in an autonomous mode or a non-autonomous mode. For purposes of this disclosure, the autonomous mode is defined as one in which the steering system 20 is controlled by the computer 32. In the non-autonomous mode, a human operator controls the steering system 20.

The vehicle 22 may include an instrument panel. The instrument panel may be disposed at a forward end of a passenger cabin of the vehicle 22 and face toward front seats of the vehicle 22. The instrument panel may include vehicle controls, including the steering wheel 30.

The steering wheel 30 allows an operator to steer the vehicle 22 by transmitting rotation of the steering wheel 30 to movement of a steering rack. The steering wheel 30 may be, e.g., a rigid ring fixedly attached to a steering column 42. The steering column 42 transfers rotation of the steering wheel 30 to movement of the hydraulic steering assembly 36 via the torque overlay device 24. The steering column 42 may be, e.g., a shaft, one or more universal joints, etc., connecting the steering wheel 30 to the hydraulic steering assembly 36.

Figure 2:
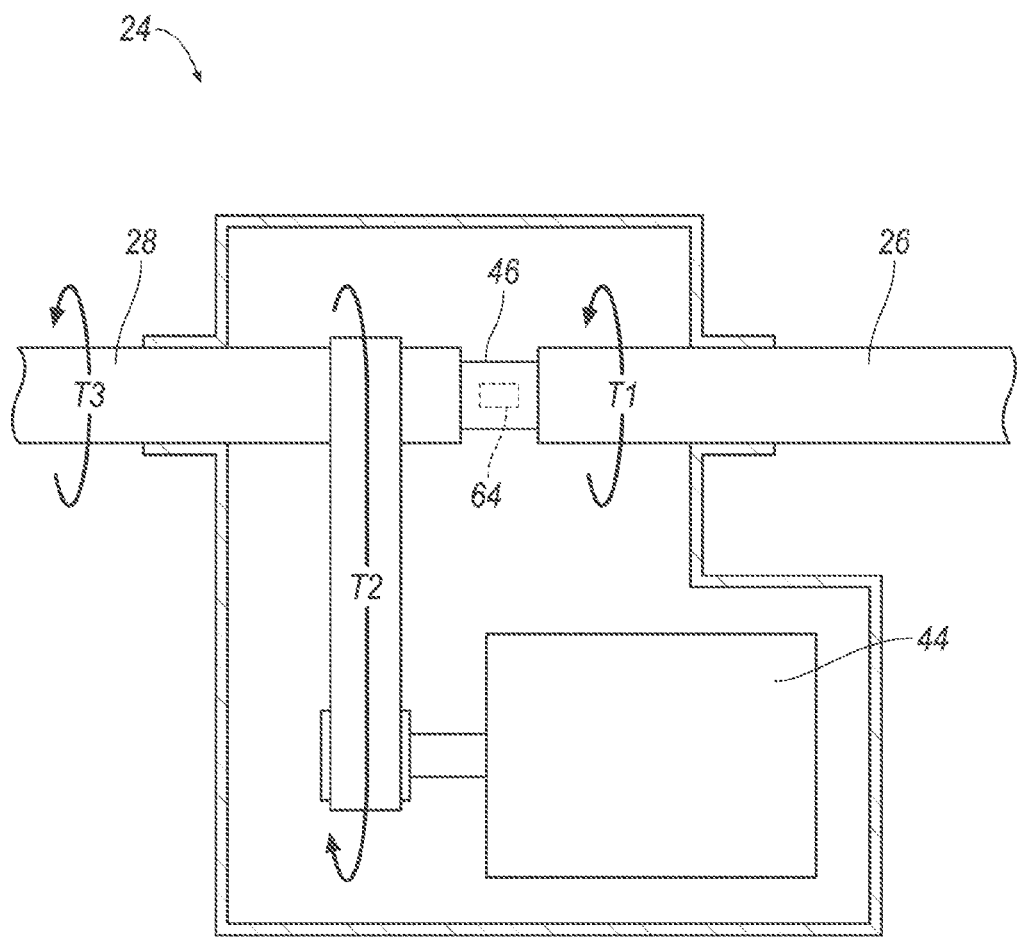
FIG. 2 is a cross section of a torque overlay device of the steering system.

With reference to FIG. 2, the torque overlay device 24 supplements torque T1 provided to the steering system 20 by an operator via the steering wheel 30 to regulate torque T3 provided to the hydraulic steering assembly 36 to control the steering angle A of the wheels 34. The torque overlay device 24 includes the input shaft 26. Torque T1 is provided to the steering system 20 via the input shaft 26. The torque overlay device 24 may be coupled to the steering wheel 30. For example, the steering wheel 30 may be coupled to the input shaft 26 via the steering column 42. The steering column 42 may be coupled directly to the input shaft 26, e.g., a spline interface, fixed with a fastener, etc. The operator may provide torque T1 to the input shaft 26 with the steering wheel 30 coupled to control the steering system 20 and the steering angle A of the wheels 34.

The output shaft 28 provides torque T3 from the torque overlay device 24, e.g., to the hydraulic steering assembly 36. Torque T3 provided by the output shaft 28 is a sum of the torque T1 provided to the input shaft 26 and torque T2 generated by the torque overlay device 24, e.g., generated by a motor 44 of the device. Torque T3 provided by the output shaft 28 to the hydraulic steering assembly 36 may be less than the torque T1 provided to the input shaft 26, e.g., the torque T3 provided by the output shaft 28 may be the torque T1 provided to the input shaft 26 less the torque T2 generated by the motor 44 when the motor 44 provides torque T2 to the output shaft 28 in an opposite direction, e.g., rotational direction, relative to the torque T1 provided to the input shaft 26 from the steering wheel 30.

An example algorithm illustrating the relationship between the torques T1, T2, T3 may be represented by the equation T1+(−T2)=T3, where T1 is the torque provided to the input shaft 26, T2 is the torque generated by the torque overlay device 24, and T3 is the torque output via the output shaft 28. T1 and T3 are both positive numbers, indicating a common direction. T2 is a negative number indicating a direction opposite T1 and T3.

With continued reference to FIG. 2, the output shaft 28 is coupled to the input shaft 26. Coupling the output shaft 28 to the input shaft 26 transfers torque therebetween. For example, the torque overlay device 24 may include a torsion bar 46. The torsion bar 46 may connect the input shaft 26 to the output shaft 28. For example, one end of the torsion bar 46 may be fixed to the input shaft 26, and an opposite end of the torsion bar 46 may be fixed to the output shaft 28, e.g., via welding, etc. As another example, the torsion bar 46, the input shaft 26, and/or the output shaft 28 may be monolithic, i.e., a single piece of material with no seams, joints, fasteners, or adhesives holding the torsion bar 46, the input shaft 26, and/or the output shaft 28 together. As described below, detected strain of the torsion bar 46 may be used to calculate the torque T1 applied to the input shaft 26.

The motor 44 generates the torque T2 provided by the torque overlay device 24. For example, the motor 44 may be an electric motor that coverts electricity into torque with a rotor and a stator, a servo motor that includes a rotational position sensor, a brushed motor, a brushless motor, or any other suitable type. The motor 44 may be operatively coupled to the output shaft 28 to transfer torque therebetween. For example, a shaft of the motor 44 may be operatively coupled to the output shaft 28 of the torque overlay device 24 via belts, pullies, gears, chains, sprockets, shafts, etc. The motor 44 may actuate to provide torque in response to an instruction from the computer 32, e.g., indicating a certain direction and magnitude of torque to generate, etc. For example, the computer 32 may instruct actuation of the motor 44 with electricity provided at a certain polarity, voltage, frequency, etc.

The torque T2 generated by the torque overlay device 24 that supplements the torque T1 provided to the input shaft 26 via the steering wheel 30 may be governed by governmental regulations and industry standards. For example, industry standards and regulation may require that a magnitude of torque T2 generated by the torque overlay device 24, e.g., provided to the output shaft 28 from the motor 44, be less than 3 Newton-meters.

The hydraulic steering assembly 36 receives torque T3, e.g., from the output shaft 28, to control the steering angle A of the wheels 34 of the vehicle 22. More specifically, the hydraulic steering assembly 36 uses hydraulic pressure to boost torque T3 provided via the output shaft 28 to control the steering angle A of the wheels 34. The higher the hydraulic pressure of the hydraulic steering assembly 36, the greater the responsiveness of the steering system 20. In other words, the hydraulic steering assembly 36 provided with a higher pressure of hydraulic fluid will change steering angle A more rapidly than the hydraulic steering assembly 36 provided with a lower pressure of hydraulic fluid when provided a same magnitude of torque T3 from the output shaft 28.

With reference to FIG. 1, the hydraulic steering assembly 36 may include a piston and cylinder arrangement 48 designed to apply force to the wheels 34 and control the steering angle A in response to providing hydraulic fluid the piston and cylinder arrangement 48. The piston and cylinder arrangement 48 may receive hydraulic fluid from a control valve 50 that regulates the flow of hydraulic fluid to the piston and cylinder arrangement 48. The control valve 50 may receive hydraulic fluid from a pump 52 and a hydraulic fluid reservoir 54 of the hydraulic steering system 20. The pump 52 may be a rotary vane pump, or any suitable pump.

The hydraulic steering assembly 36 may be coupled to the output shaft 28 of the torque overlay device 24. For example, the output shaft 28 may be coupled to the control valve 50, e.g., via intermediary shafts, universal joints, etc., such that torque T3 from the output shaft 28 controls operation of the control valve 50 to change the steering angle A. In other words, torque T3 from the output shaft 28 may control an opening direction and magnitude of the control valve 50.

Figure 3:
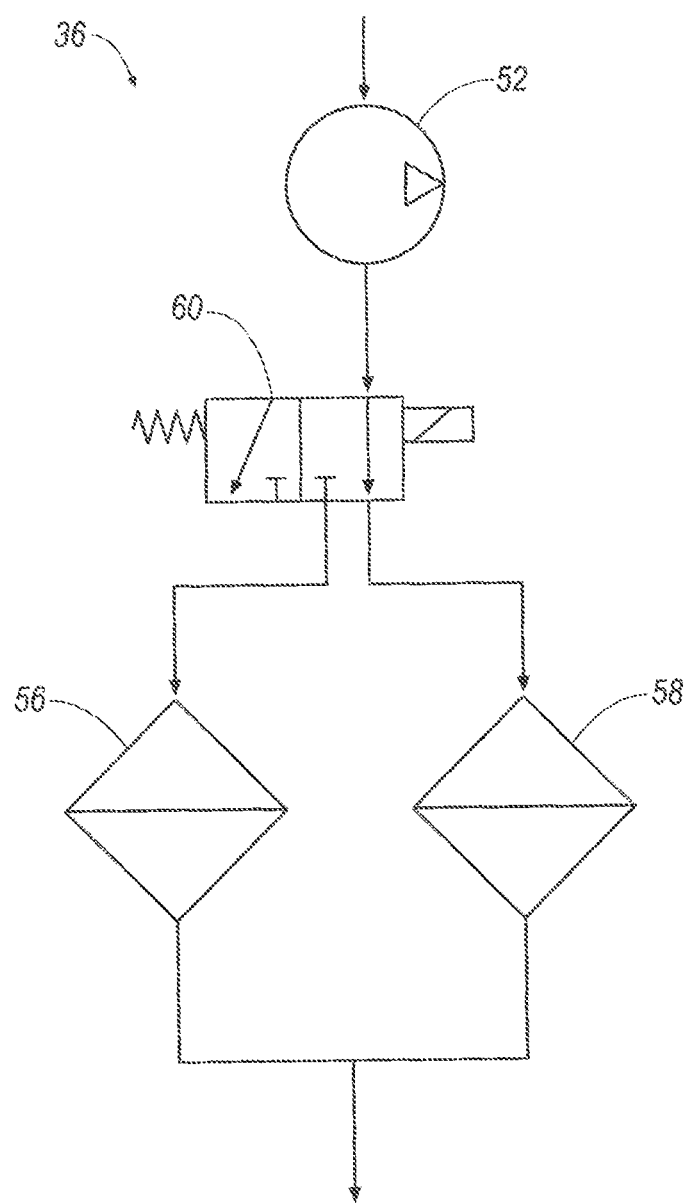
FIG. 3 is a schematic of components of a hydraulic steering assembly of the steering system.

With reference to FIGS. 1 and 3, the hydraulic steering assembly 36 may include one or more pressure regulators 56, 58, e.g., a first pressure regulator 56 and a second pressure regulator 58. The pressure regulators 56, 58 regulate a pressure of the hydraulic fluid proved to piston and cylinder arrangement 48 from the pump 52 and fluid reservoir 54. For example, the pressure regulators 56, 58 may be operatively coupled between the pump 52 and the control valve 50. The pressure regulators 56, 58 may be single stage pressure regulators, double stage pressure regulators, or any suitable device that reduces input pressure to a certain output pressure. The second pressure regulator 58 may output fluid at a lower pressure than the first pressure regulator 56.

The first pressure regulator 56 may output fluid to the control valve 50 at a pressure sufficient to change the steering angle A of the wheels 34 in the autonomous mode. In other words, the first pressure regulator 56 may output fluid to the control valve 50 at a pressure sufficient to change the steering angle A of the wheels 34 in response to torque being applied to the output shaft 28 of the torque overlay device 24 from the motor 44 and without torque applied to the steering wheel 30 by an operator of the vehicle 22. For example, the first pressure regulator 56 may output fluid at 1000 psi.

The second pressure regulator 58 may output fluid to the control valve 50 at a pressure sufficient to change the steering angle A of the wheels 34 in the non-autonomous mode. In other words, the second pressure regulator 58 may output fluid to the control valve 50 at a pressure sufficient to change the steering angle A of the wheels 34 in response to torque applied to the steering wheel 30 by an operator of the vehicle 22 and while providing traditional steering response characteristics without torque being subtracted by the torque overlay device 24, e.g., in the case of a failure of the motor 44, a loss of electrical power in the vehicle 22, etc. For example, the second pressure regulator 58 may output fluid at 200 psi.

With continued reference to FIGS. 1 and 3, the steering assembly may include a valve 60 designed to selectively provide fluid to the first pressure regulator 56 or the second pressure regulator 58. The pump 52 may be designed to provide fluid to the valve 60. For example, the valve 60 may be operatively coupled to the pump 52 and fluid reservoir 54 to receive fluid, e.g., via hoses, etc. and operatively coupled to the first pressure regulator 56 and the second pressure regulator 58 e.g., via hoses, etc. The valve 60 may be movable to a first position in which fluid is provided to the first pressure regulator 56 and not the second pressure regulator 58. The valve 60 may be movable to a second position in which fluid is provided to the second pressure regulator 58 and not the first pressure regulator 56. The valve 60 may include an actuator, e.g., an electro-magnetic actuator, etc., in communication with the computer 32 and designed to move the valve 60 between the first position and the second position. The valve 60 may be designed to provide fluid to the second pressure regulator 58 when the valve 60 is in an unpowered state. For example, the valve 60 may include a spring that biases the valve 60 to the second position when power is not supplied to the actuator.

Figure 4:
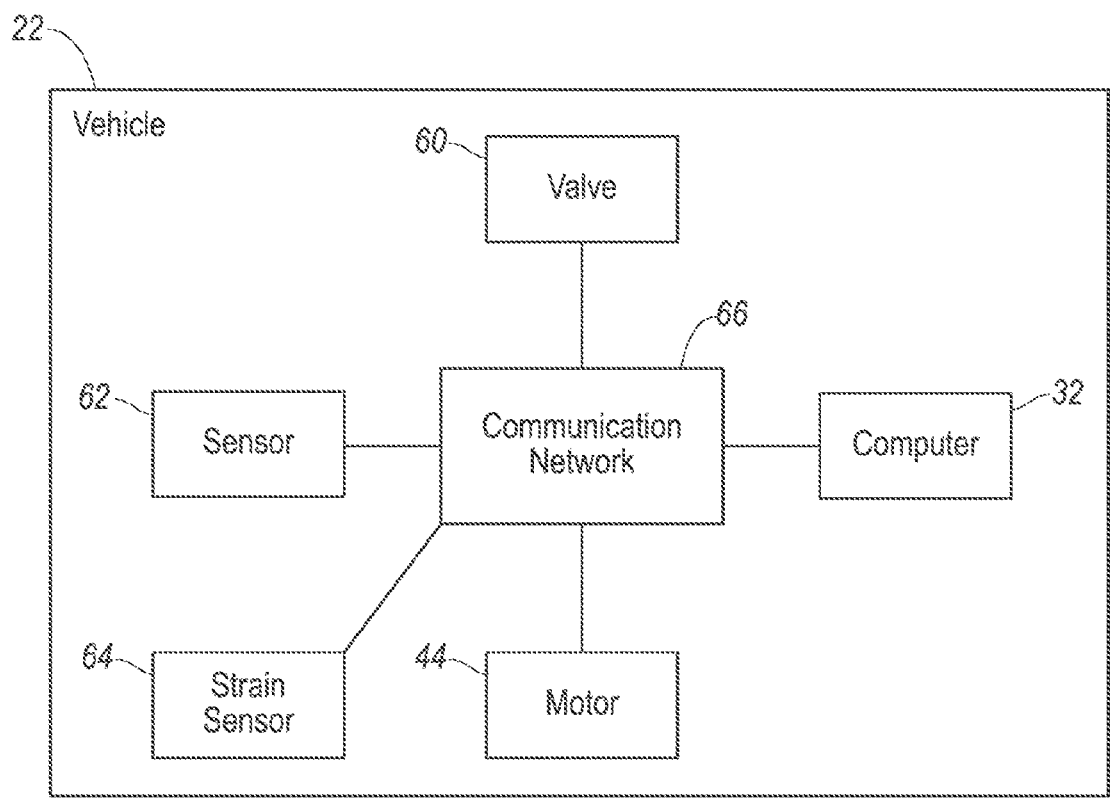
FIG. 4 is a block diagram of components of the vehicle.

With reference to FIG. 4, the vehicle 22 may include sensors 62. The sensors 62 may detect internal states of the vehicle 22, for example, wheel speed, wheel orientation, and steering system variables. For example, the sensors 62 may include position sensors designed to detect a rotational position of steering column 42. The sensors 62 may detect the position or orientation of the vehicle 22, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 62 may detect the external world, for example, radar sensors, scanning laser range finders, light detection and ranging (LIDAR) devices, and image processing sensors such as cameras. The sensors 62 may include communications devices, for example, vehicle-to-infrastructure (V2I) or vehicle-to-vehicle (V2V) devices.

A strain sensor 64 (numbered in FIGS. 2 and 4) may be used to detect an amount of relative torque between the input shaft 26 of the torque overlay device 24 and the output shaft 28 of the torque overlay device 24. For example, relative torque between the input shaft 26 and the output shaft 28 may cause stress and strain in the torsion bar 46. The strain may be detected by the strain sensor 64. For example, the strain sensor 64 may be fixed to the torsion bar 46, and an electrical resistance of the strain sensor 64 may change relative to the amount of strain of the torsion bar 46.

The vehicle 22 may include a communication network 66. The communication network 66 includes hardware, such as a communication bus, for facilitating communication among vehicle components, e.g., the computer 32, motor 44, the valve 60, the sensors 62, the strain sensor 64, etc. The communication network 66 may facilitate wired or wireless communication among the vehicle components in accordance with a number of communication protocols such as computer area network (CAN), Ethernet, WiFi, Local Interconnect Network (LIN), and/or other wired or wireless mechanisms.

The computer 32 may be a microprocessor-based computer implemented via circuits, chips, or other electronic components. For example, the computer 32 may include a processor, memory, etc. The memory of the computer 32 may include memory for storing instructions executable by the processor as well as for electronically storing data and/or databases. Although one computer 32 is shown in FIG. 4 for ease of illustration, it is to be understood that the computer 32 could include, and various operations described herein could be carried out by, one or more computing devices.

The memory of the computer 32 stores instructions executable by the processor to detect the torque T1 applied to the input shaft 26. The computer 32 may detect a direction and an amount of torque T1 applied to the input shaft 26. The computer 32 may detect the torque T1 applied to the input shaft 26 based on a detected strain of the torsion bar 46, based on information from the sensors, e.g., position sensors design to detect the rotational position of the steering column 42, etc. For example, the computer 32 may receive information from the strain sensor 64 indicating an amount of strain of the torsion bar 46. The computer 32 may store a look-up table or the like in the memory associating various detected strains with various magnitudes and directions of torque. The computer 32 may adjust the torque from the look-up table with the torque T2 provided by the torque overlay device 24 to determine the detected torque applied to the input shaft 26. To put it another way, the computer 32 may determine an overall torque based on the detected strain of the torsion bar 46, and then may subtract torque T2 provided by the motor 44 to the output shaft 28 to determine the detected torque T1 applied to the input shaft 26. The computer 32 may further determine the detected torque T1 applied to the input shaft 26 with an adjustment based on a rotational inertia value of the input shaft 26, the output shaft 28, the steering wheel 30, etc., based on a resistance to rotation applied to the output shaft 28 by the hydraulic steering assembly 36, etc. Other techniques may be used to detect the torque T1 applied to the input shaft 26.

The memory of the computer 32 stores instructions executable by the processor to actuate the torque overlay device 24. For example, the computer 32 may transmit an instruction to the torque overlay device 24 via the communication network 66 indicating a direction and a magnitude of torque T2 to provide. For example, the instruction may indicate a polarity, a voltage amount, a pulse width, etc., of electricity to provide the motor 44. The computer 32 may control actuation of the torque overlay device 24 with other techniques.

The computer 32 may actuate the torque overlay device 24 to provide torque T2 to the output shaft 28 in a direction opposite the torque T1 applied to the input shaft 26. For example, the computer 32 may actuate the torque overlay device 24 to provide torque T2 in a counter clockwise direction when the detected direction if the torque T1 applied to the input shaft 26 is clockwise, e.g., relative to a common datum. The computer 32 may actuate to the torque overlay device 24 to provide a lower magnitude of torque T2 than the detected amount of torque T1 applied to the input shaft 26. In other words, the computer 32 may actuate the torque overlay device 24 such that the input shaft 26 and the output shaft 28 rotate in a common direction, with the output shaft 28 providing lower torque T3 to the hydraulic steering assembly 36 than the torque T1 applied to the input shaft 26, e.g., via the steering wheel 30.

The computer 32 may actuate the torque overlay device 24 to provide torque T2 to the output shaft 28 in the direction opposite the torque T1 applied to the input shaft 26 in response to detecting a vehicle speed above a predetermined threshold. The computer 32 may detect the vehicle speed based on information received from the sensors 62, e.g., information from a wheel speed sensor transmitted via the communication network 66. The computer 32 may compare the detected speed with the predetermined threshold. When the vehicle speed is above the predetermined threshold, the computer 32 may actuate the torque overlay device 24 to provide torque T2 to the output shaft 28 in the direction opposite the detected the direction of torque T1 applied to the input shaft 26. The computer 32 may vary the amount of torque T2 provided by the torque overlay device 24 based on whether the vehicle speed is above or below the predetermined threshold. For example, the computer 32 may actuate the torque overlay device 24 to provide torque T2 to the output shaft 28 at a first magnitude and in the direction opposite the torque T1 applied to the input shaft 26 in response to detecting the vehicle speed above the predetermined threshold, and may actuate the torque overlay device 24 to provide torque T2 to the output shaft 28 at a second magnitude and in the direction opposite the torque T1 applied to the input shaft 26 in response to detecting the vehicle speed below the predetermined threshold. The second magnitude may be less than the first magnitude. In other words, for a common amount of torque T1 provided to the input shaft 26, the computer 32 may actuate the torque overlay device 24 to provide torque T2 such that the torque T3 is greater when the vehicle speed is below the predetermined threshold as compared to when the vehicle speed is above the predetermined threshold. The adjectives "first" and "second" are used throughout this document as identifiers and are not intended to signify importance or order.

The computer 32 may by programmed to detect a fault of the vehicle 22. As used herein, a fault is a malfunction of a component of the vehicle 22 that may alter how the vehicle 22 operates. The computer 32 may detect one or more faults based on information received via the communication network 66, e.g., from the motor 44, the sensors 62, etc. For example, based on information from the communication network 66 the computer 32 may detect a fault indicating that the torque overlay device 24 is not function as intended, e.g., the motor 44 may be sort circuited and unable to provide torque, etc.

The computer 32 may by programmed to actuate the valve 60 to provide fluid to the first pressure regulator 56 of the hydraulic steering assembly 36 prior to detecting a fault, and to actuate the valve 60 to provide fluid to the second pressure regulator 58 of the hydraulic steering assembly 36 that outputs fluid at a lower pressure than the first pressure regulator 56 in response to detecting the fault. For example, prior to detecting the fault, e.g., based on information from the communication network 66, the computer 32 may instruct the valve 60, e.g., via the communication network 66, to the first position. Upon detecting the fault the computer 32 may instruct the valve 60 to the second position.

Figure 5:
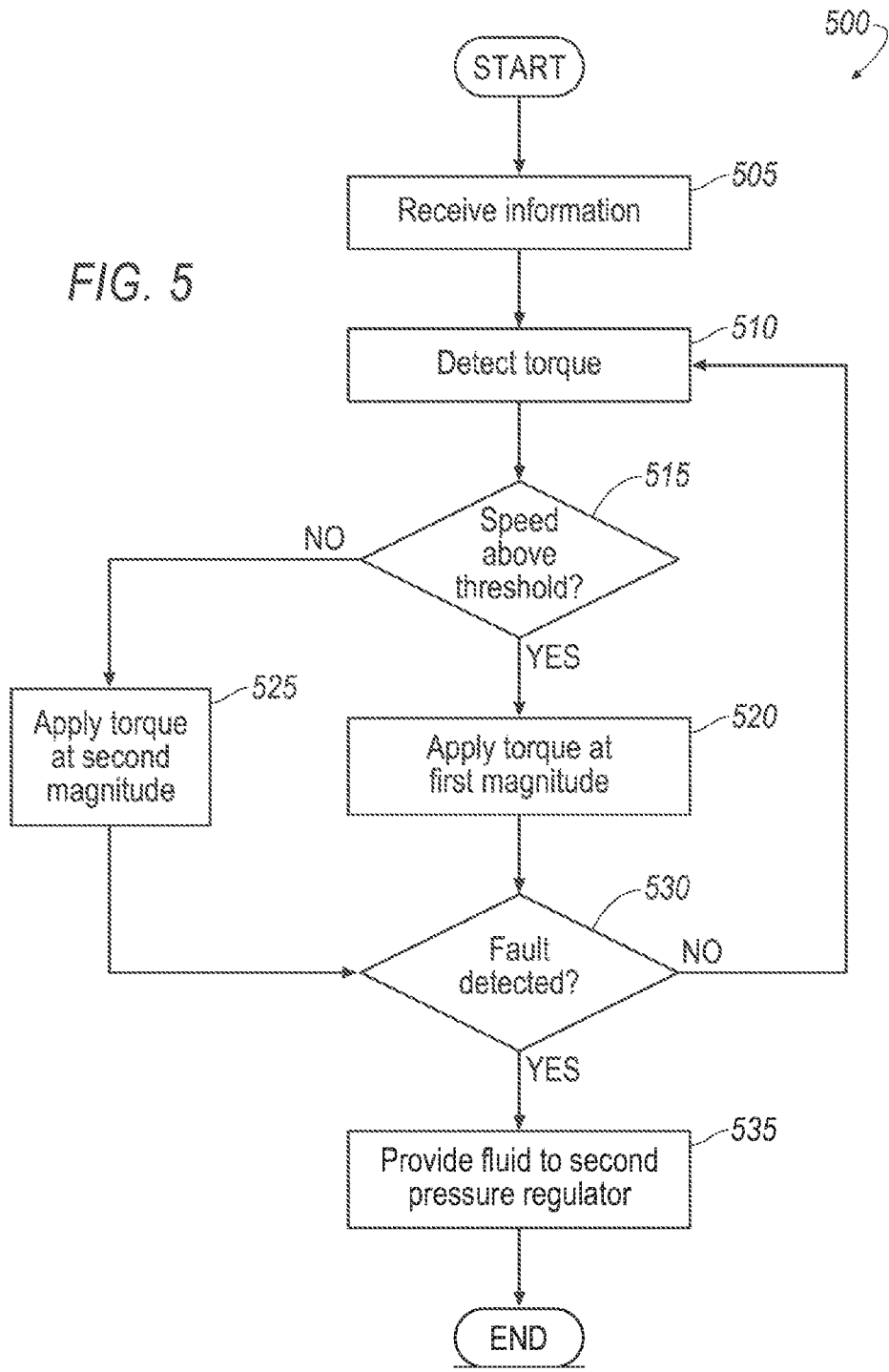
FIG. 5 is a flow chart of a process for controlling the steering system.

FIG. 5 is a process flow diagram illustrating an exemplary process 500 for controlling the torque overlay device 24 to reduce sensitivity of the steering system 20 relative to torque T1 received from the steering wheel 30. The process 500 begins in a block 505 where the computer 32 receives information from the sensors 62, the strain sensor 64, etc., e.g., via the communication network 66. The computer 32 may receive such information substantially continuously or at time intervals, e.g., every 100 milliseconds. The computer 32 may provide fluid to the first pressure regulator 56 of the hydraulic steering assembly 36, e.g., the computer 32 may instruct the valve 60 to the first position when the process 500 begins.

At a block 510 the computer 32 detects the torque T1 applied to the input shaft 26 of the torque overlay device 24 coupled to the steering wheel 30, e.g., based on a detected strain of the torsion bar 46 connecting the input shaft 26 to the output shaft 28. For example, the computer 32 may detect the direction and amount of torque applied to the input shaft 26 based on information from the sensors 62, the strain sensor 64, e.g., as described herein.

At a block 515 the computer 32 determines whether the vehicle speed is above the predetermined threshold, e.g., based on information from the sensors 62. Upon determining that the vehicle speed is above the predetermined threshold, the process 500 moves to a block 520. Upon determining that the vehicle speed is not above the predetermined threshold the process 500 moves to a block 525.

At the block 520 the computer 32 actuates the torque overlay device 24 to provide torque T2 to the output shaft 28 of the torque overlay device 24 in a direction opposite the torque T1 applied to the input shaft 26, e.g., as detected by the computer 32 in the block 510, and at a first magnitude. For example, the computer 32 may transmit an instruction to the torque overlay device 24 via the communication network 66 instructing actuation of the motor 44, e.g., as described herein. After the block 520 the process 500 moves to a block 530.

At the block 525, the computer 32 actuates the torque overlay device 24 to provide torque T2 to the output shaft 28 at a second magnitude that is less than the first magnitude and in the direction opposite the torque T1 applied to the input shaft 26. After the block 525 the process 500 moves to the block 530.

At the block 530, the computer 32 determines whether a fault has been detected. For example, the computer 32 may determine whether a fault has been detected based on information from the communication network 66, e.g., as described herein. Upon determining that a fault has been detected the process 500 moves to a block 535. Upon determining that a fault has not been detected the process 500 may return the block 510. Alternately, the process 500 may end.

At the block 535, the computer 32 may provide fluid to the second pressure regulator 58 of the hydraulic steering assembly 36 that outputs fluid at a lower pressure than the first pressure regulator 56. For example, the computer 32 may instruct the valve 60 to the second position. After the block 535 the process 500 may return the block 510. Alternately, the process 500 may end.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
   a torque overlay device having an input shaft and an output shaft coupled to the input shaft;
   a steering wheel coupled to the input shaft;
   a hydraulic steering assembly coupled to the output shaft, the hydraulic steering assembly including a first pressure regulator, a second pressure regulator that outputs fluid at a lower pressure than the first pressure regulator, and a valve designed to selectively provide fluid to the first pressure regulator or the second pressure regulator;
   a processor; and
   a memory storing instructions executable by the processor to detect a torque applied to the input shaft and to actuate the torque overlay device to provide torque to the output shaft in a direction opposite the torque applied to the input shaft.

2. The system of claim 1, wherein the torque overlay device includes a torsion bar connecting the input shaft to the output shaft.

3. The system of claim 2, wherein the memory stores instructions executable by the processor to detect the torque applied to the input shaft based on a detected strain of the torsion bar.

4. The system of claim 1, wherein the memory stores instructions executable by the processor to actuate the valve to provide fluid to the second pressure regulator in response to detecting a fault.

5. The system of claim 1, wherein the valve is designed to provide fluid to the second pressure regulator when the valve is in an unpowered state.

6. The system of claim 1, wherein the hydraulic steering assembly includes a pump designed to provide fluid to the valve.

7. The system of claim 1, wherein the memory stores instructions executable by the processor to actuate the torque overlay device to provide torque to the output shaft in the direction opposite the torque applied to the input shaft in response to detecting a vehicle speed above a predetermined threshold.

8. The system of claim 1, wherein the memory stores instructions executable by the processor to actuate the torque overlay device to provide torque to the output shaft at a first magnitude and in the direction opposite the torque applied to the input shaft in response to detecting a vehicle speed above a predetermined threshold, and to provide torque to the output shaft at a second magnitude that is less than the first magnitude and in the direction opposite the torque applied to the input shaft in response to detecting a vehicle speed below the predetermined threshold.

9. A system, comprising a processor and a memory storing instructions executable by the processor to:
   detect a torque applied to an input shaft of a torque overlay device coupled to a steering wheel; and
   actuate the torque overlay device to provide torque to an output shaft of the torque overlay device at a first magnitude and in a direction opposite the torque applied to the input shaft in response to detecting a vehicle speed above a predetermined threshold, and to actuate the torque overlay device to provide torque to the output shaft at a second magnitude that is less than the first magnitude and in the direction opposite the torque applied to the input shaft in response to detecting a vehicle speed below the predetermined threshold.

10. The system of claim 9, wherein the memory stores instructions executable by the processor to detect the torque applied to the input shaft based on a detected strain of a torsion bar connecting the input shaft to the output shaft.

11. The system of claim 9, wherein the memory stores instructions executable by the processor to actuate a valve to provide fluid to a first pressure regulator of a hydraulic steering assembly prior to detecting a fault, and to actuate the valve to provide fluid to a second pressure regulator of the hydraulic steering assembly that outputs fluid at a lower pressure than the first pressure regulator in response to detecting the fault.

12. A method, comprising:
   detecting a torque applied to an input shaft of a torque overlay device coupled to a steering wheel;
   actuating the torque overlay device to provide torque to an output shaft of the torque overlay device in a direction opposite the torque applied to the input shaft; and
   providing fluid to a first pressure regulator of a hydraulic steering assembly prior to detecting a fault, and providing fluid to a second pressure regulator of the hydraulic steering assembly that outputs fluid at a lower pressure than the first pressure regulator in response to detecting the fault.

13. The method of claim 12, further comprising detecting the torque applied to the input shaft based on a detected strain of a torsion bar connecting the input shaft to the output shaft.

14. The method of claim 12, further comprising actuating the torque overlay device to provide torque to the output shaft in the direction opposite the torque applied to the input shaft in response to detecting a vehicle speed above a predetermined threshold.

15. The method of claim 12, further comprising actuating the torque overlay device to provide torque to the output shaft at a first magnitude and in the direction opposite the torque applied to the input shaft in response to detecting a vehicle speed above a predetermined threshold, and actuating the torque overlay device to provide torque to the output shaft at a second magnitude that is less than the first magnitude and in the direction opposite the torque applied to the input shaft in response to detecting a vehicle speed below the predetermined threshold.

* * * * *